J. KUEHL & J. STEFANOWSKI.
SPRING WHEEL.
APPLICATION FILED JULY 1, 1910.
1,026,810.
Patented May 21, 1912.
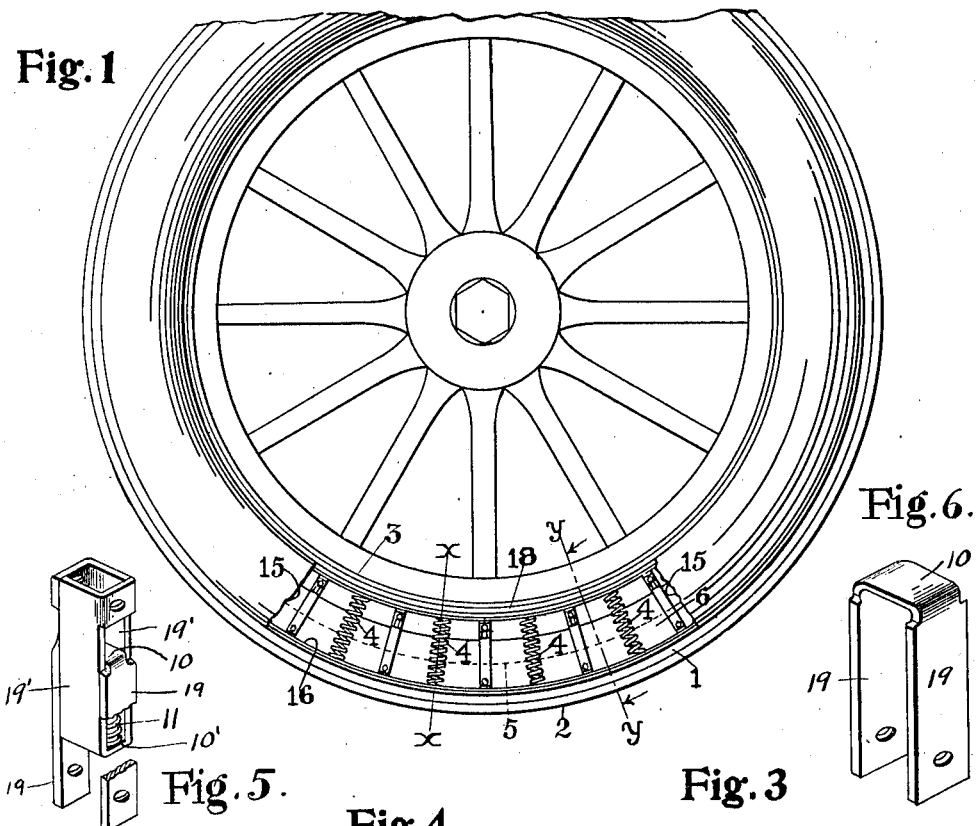
Fig. 1. Fig. 6. Fig. 5. Fig. 3. Fig. 4. Fig. 2.
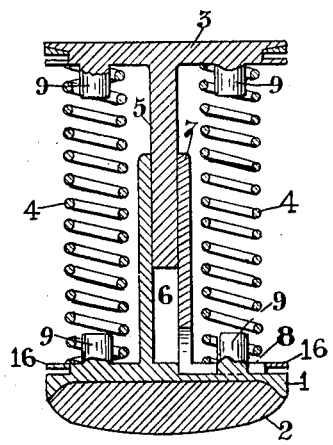
Witnesses
A. M. Shannon.
C. R. Stickney.
Inventors
JOSEPH KUEHL
JOSEPH STEFANOWSKI
By Barthel & Barthel
Attorneys
COLUMBIA PLANOGRAPH CO., WASHINGTON, D. C.

UNITED STATES PATENT OFFICE.

JOSEPH KUEHL AND JOSEPH STEFANOWSKI, OF DETROIT, MICHIGAN.

SPRING-WHEEL.

1,026,810. Specification of Letters Patent. Patented May 21, 1912.

Application filed July 1, 1910. Serial No. 569,897.

*To all whom it may concern:*

Be it known that we, JOSEPH KUEHL and JOSEPH STEFANOWSKI, citizens of the United States of America, residing at Detroit, in the county of Wayne and State of Michigan, have invented certain new and useful Improvements in Spring-Wheels, of which the following is a specification, reference being had therein to the accompanying drawings.

This invention relates to a cushion tire for vehicle wheels in which provision for the desired resiliency is made in such manner as to exclude moisture and dirt from the mechanism.

The invention consists in the matters hereinafter set forth, and more particularly pointed out in the appended claim.

In the drawings, Figure 1 is a view in side elevation of a wheel equipped with a tire embodying features of the invention with portions of a shield partly broken away; Fig. 2 is a view in section, enlarged, on line x—x of Fig. 1; Fig. 3 is a view in section, enlarged on line y—y of Fig. 1; and Fig. 4 is a view in detail of a coupling member; Fig. 5 is a perspective view of the tension link, assembled but partially broken away; and Fig. 6 shows a perspective view of one of the members thereof.

Referring to the drawings, a rim 1 of metal or like suitable material, with an outer face adapted to retain a cushion tread 2 or the like is concentrically spaced from the inner ring 3 by a series of radially disposed springs 4 in compression between them. Lateral displacement of the rim is prevented by an outer rib 5 on the ring which plays between the parallel faces of a fixed flange 6 and removable flange 7 on the inner periphery of the rim. The flange 7 is preferably provided with a foot collar 8 that fits snugly in the rim, and is secured in place as by bolts or the like. Projections or keepers 9 on the proximate faces of the rim and ring, retain the springs, the flange 7 being notched to slip past those on the rim.

Rotation of the rim on the ring is prevented by links. These each consist of a pair of flat metal strips bent between their ends into parallel arms 19, 19' connected by shanks 10, 10' respectively. The strips are hooked together, the shanks being narrower than the arms so that the resultant notches in the margins of each strip act as guideways for the other strip. A spring 11 is in compression between the shanks 10, 10', and the ends of the strips are connected by pivot studs 12 or the like to lugs 13 on the rim and like projections 14 on the ring. Annular flexible covers 15 of suitable material connect the corresponding margins of the ring and rim as a disk shield. Preferably keeper rings 16 and screws 17 secure the bands to the rim, the latter being rabbeted around its edges for receiving the rings. The other edges of the bands are held in tapered grooves in the ring by wedge-shaped rings 18. By this arrangement a resilient tire of simple construction is obtained which is readily applied to any wheel of proper size.

Obviously, changes in details of construction may be made without departing from the spirit of the invention, and we do not limit ourselves to any particular form or arrangement of parts.

What we claim as our invention is:

In a cushion tire, the combination with an outer rim having an internal annular guide flange, an inner ring having an external annular rib, means for maintaining said flange and rib in sliding engagement with each other, and springs interposed between the rim and ring and for normally centering the same relatively to each other, of tension-links each consisting of a pair of flat metal strips bent intermediate its ends to form parallel side-arms connected by a shank and both members being hooked together, a spring under compression between the shanks of each pair, and lugs on the rim and ring for pivotally receiving the outer ends of said members and for maintaining the rotative relation between said rim and ring.

In testimony whereof we affix our signatures in presence of two witnesses.

JOSEPH KUEHL.
JOSEPH STEFANOWSKI.

Witnesses:
C. R. STICKNEY,
OTTO F. BARTHEL.

Copies of this patent may be obtained for five cents each, by addressing the "Commissioner of Patents, Washington, D. C."